United States Patent
Franaszek

[19]
[11] Patent Number: 5,864,859
[45] Date of Patent: Jan. 26, 1999

[54] SYSTEM AND METHOD OF COMPRESSION AND DECOMPRESSION USING STORE ADDRESSING

[75] Inventor: Peter Anthony Franaszek, Mt. Kisco, N.Y.

[73] Assignee: International Business Machines Corporation, Armonk, N.Y.

[21] Appl. No.: 603,976

[22] Filed: Feb. 20, 1996

[51] Int. Cl.[6] .................................................. G06F 17/30
[52] U.S. Cl. ........................... 707/101; 707/1; 707/6; 707/7; 707/100
[58] Field of Search .................... 395/612, 703, 395/400–499, 401–9, 888, 600, 394, 500; 341/500–599; 364/715.02; 271/145; 707/101; 711/209; 6/171; 570/168

[56] References Cited

U.S. PATENT DOCUMENTS

| | | | |
|---|---|---|---|
| 4,638,429 | 1/1987 | Chang et al. ........................... | 395/394 |
| 4,660,130 | 4/1987 | Bartley .................................... | 711/209 |
| 5,410,677 | 4/1995 | Roskowski et al. .................... | 395/500 |
| 5,455,577 | 10/1995 | Silivka et al. .......................... | 341/51 |
| 5,481,701 | 1/1996 | Chambers, IV ........................ | 707/101 |
| 5,546,575 | 8/1996 | Porter et al. ........................... | 707/101 |
| 5,551,020 | 8/1996 | Flax et al. .............................. | 707/101 |
| 5,592,342 | 1/1997 | Hall et al. ............................... | 360/48 |
| 5,623,092 | 4/1997 | Scott et al. ............................. | 570/168 |
| 5,623,701 | 4/1997 | Bakke et al. ........................... | 271/145 |
| 5,627,995 | 5/1997 | Miller et al. ............................ | 711/171 |
| 5,644,791 | 7/1997 | Brady et al. ............................ | 395/888 |

*Primary Examiner*—Thomas G. Black
*Assistant Examiner*—Diane D. Mizrahi
*Attorney, Agent, or Firm*—Kevin M. Jordan, Esq.; Scully, Scott, Murphy and Presser

[57] ABSTRACT

Variable-length data, comprising compressed pages, is stored in a memory so that access to any sub-page or line within a page can be started given a single address corresponding to the location of a fixed-length block within the memory.

13 Claims, 7 Drawing Sheets

SYSTEM AND METHOD OF COMPRESSION AND DECOMPRESSION USING STORE ADDRESSING

I. BACKGROUND OF THE INVENTION a. Field of the Invention

This invention relates generally to computer architecture and more specifically to modes of addressing in random access memories.

b. Related Art

In today's computer architectures, translation between virtual and real (physical) memory is generally done via page tables, which have, for each virtual page, its corresponding location within real memory. Access to a location within a virtual page, given by an offset from the beginning of the page, can be performed by fetching the contents of the real memory address of the page, as modified by the same offset.

An emerging development in computer architecture is the use of data compression in main or random access memory. Here, each virtual page, after compression, can be stored in some number of smaller storage blocks of either uniform or variable size with the number being dependent on the effectiveness of the compression means on this particular page. For example, virtual pages of 4 k bytes might be stored, after compression, in some number of blocks of 256 byte size. The virtual page can then be retrieved by providing to the memory controller the identities of the corresponding blocks.

As noted above, it is often desirable to access, not the entire page, but rather some location within the page, specified by the offset from the page start. In general, this may require that the entire page be first decompressed. An exception to this is when the page contents are divided into two or more lines, for example four 1 k lines per 4 k page, and the lines compressed and decompressed individually. This latter form of organization is desirable in that the amount of work required to access a particular location within a page is reduced, and with it the required latency or delay. In this latter form of organization addressing is provided to the beginning of each line, which in general may start anywhere within any of the blocks within which the compressed line is stored. This is illustrated in FIG. 1.

Figure 1:
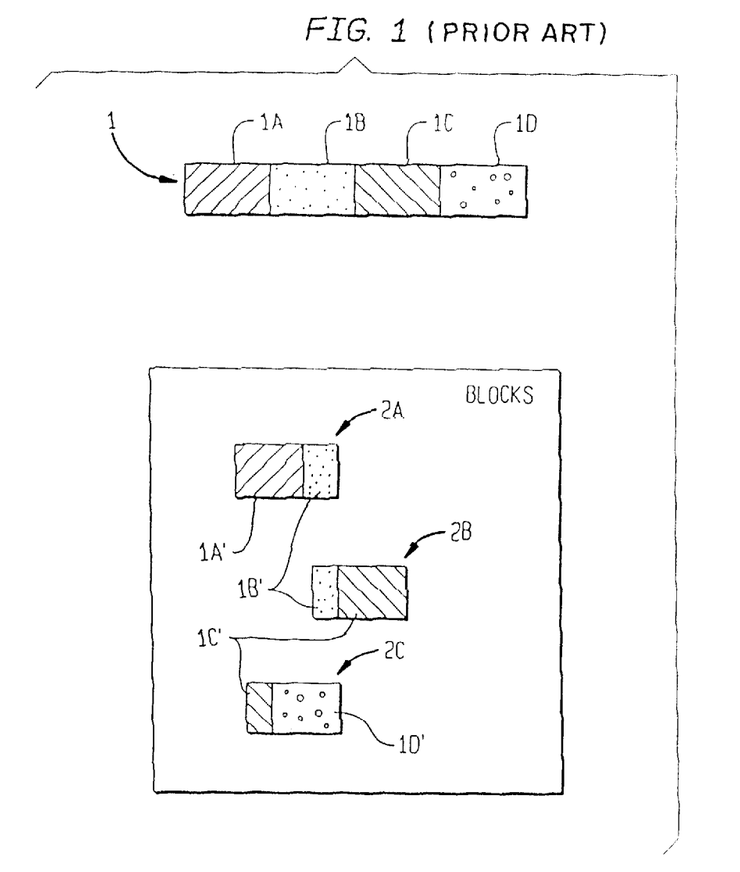
FIG. 1 illustrates a conventional storage format for a compression store.

In FIG. 1, the page 1 consists of four lines, 1a, 1b, 1c, 1d, which are stored in compressed form 1a', 1b', 1c', 1d' in three fixed size blocks 2a, 2b, 2c. Pointers to locations within these blocks are provided (by way of a table, not shown) in order to enable immediate access to the beginning of any desired line. This is awkward, however, as four such pointers need be provided to the addressing mechanism. In contrast, most of today's machines require only one such pointer, corresponding to the page frame. Moreover, in the latter form of organization the four pointers need to be long enough to specify the location within the block, not just the block, within which the desired line resides. This increases the number of bits per pointer.

II. SUMMARY OF THE INVENTION

It is an object of this invention to provide for storing and accessing lines within a compressed page so that only a single address need be provided to gain access to any or all lines within a compressed page, with all lines accessed simultaneously for example if the entire page is to be decompressed in parallel. It is also an object of this invention to provide for processing the address to the compressed page so as to determine the location of the beginning of the desired line or lines. A yet further object of this invention is to provide immediate access to sufficient compressed data from any line so as to start the decompression process.

These and further objects and features are provided by (a) storing the beginning of all lines from a page at fixed positions within a single block, termed the anchor block, and (b) continuing the lines within some number of required blocks, as determined by the compression means. That is, even though each line has a compressed length which may be different, the starting locations of the lines within the anchor block are fixed. This fixed format then permits a simple calculation to obtain the start of each line, given the address of the anchor block.

IV. DETAILED DESCRIPTION OF THE PREFERRED EMBODIMENT

Figure 2:
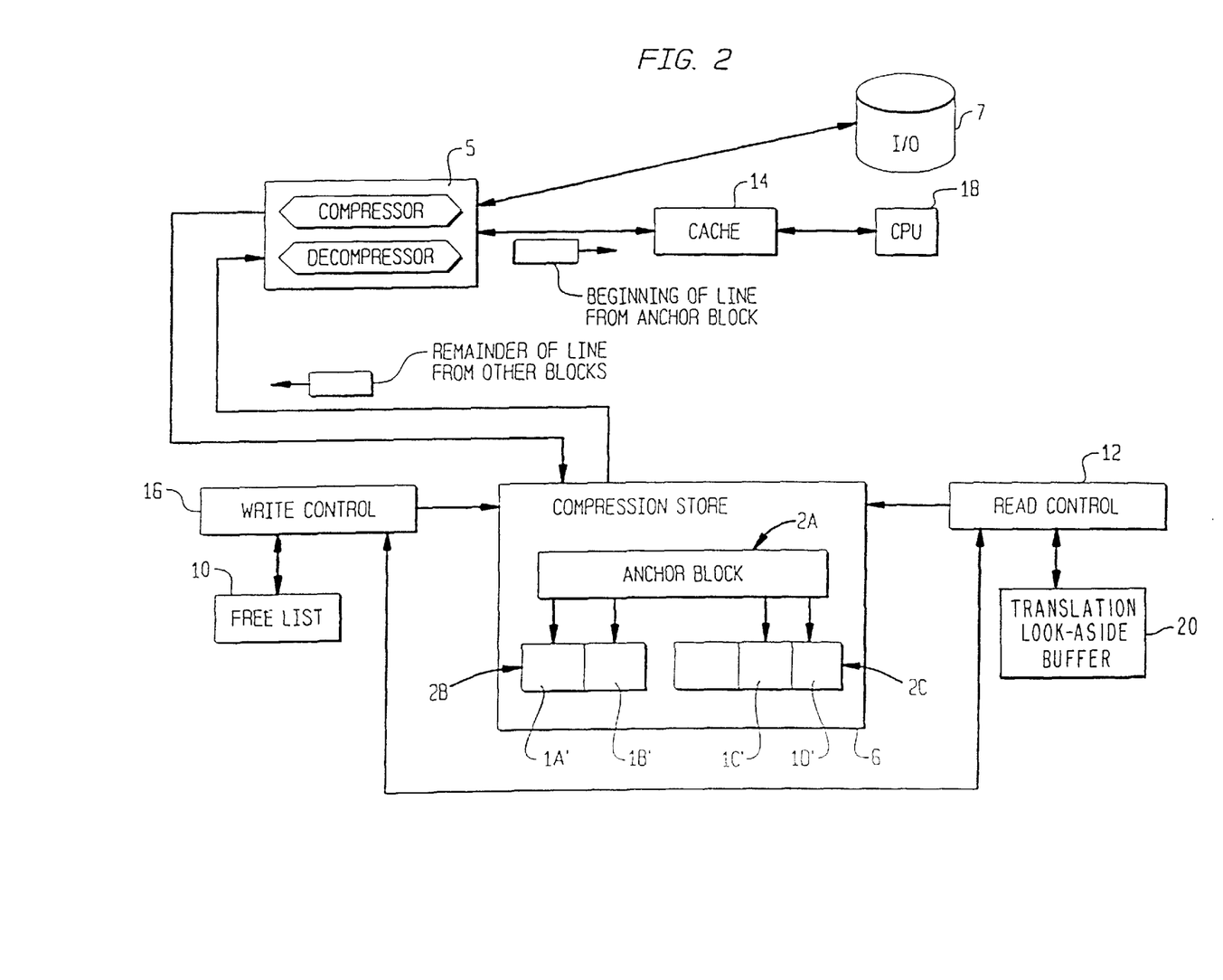
FIG. 2 shows a computing system which utilizes a compression store in accordance with the principles of the present invention.

FIG. 2 shows a computing system which utilizes a compression store 6 in accordance with the principles of the present invention. The system includes a CPU 18 which includes read controls 12, write controls 16 and a translation look-aside buffer (TLB) 20. Those of skill in the art will recognize that the CPU and computing system also include a number of other conventional components which are not described here. The system also includes a conventional cache memory subsystem 14. Pages entered from an I/O device 7 are compressed via a compressor/decompressor 5 and stored in the compression store 6. The compressor/decompressor 5 can be embodied, for example, as a processor utilizing a standard compression algorithm such as Lempel-Ziv 1. The compression store 6 can be a portion of the system's main, random access memory.

Figure 3:
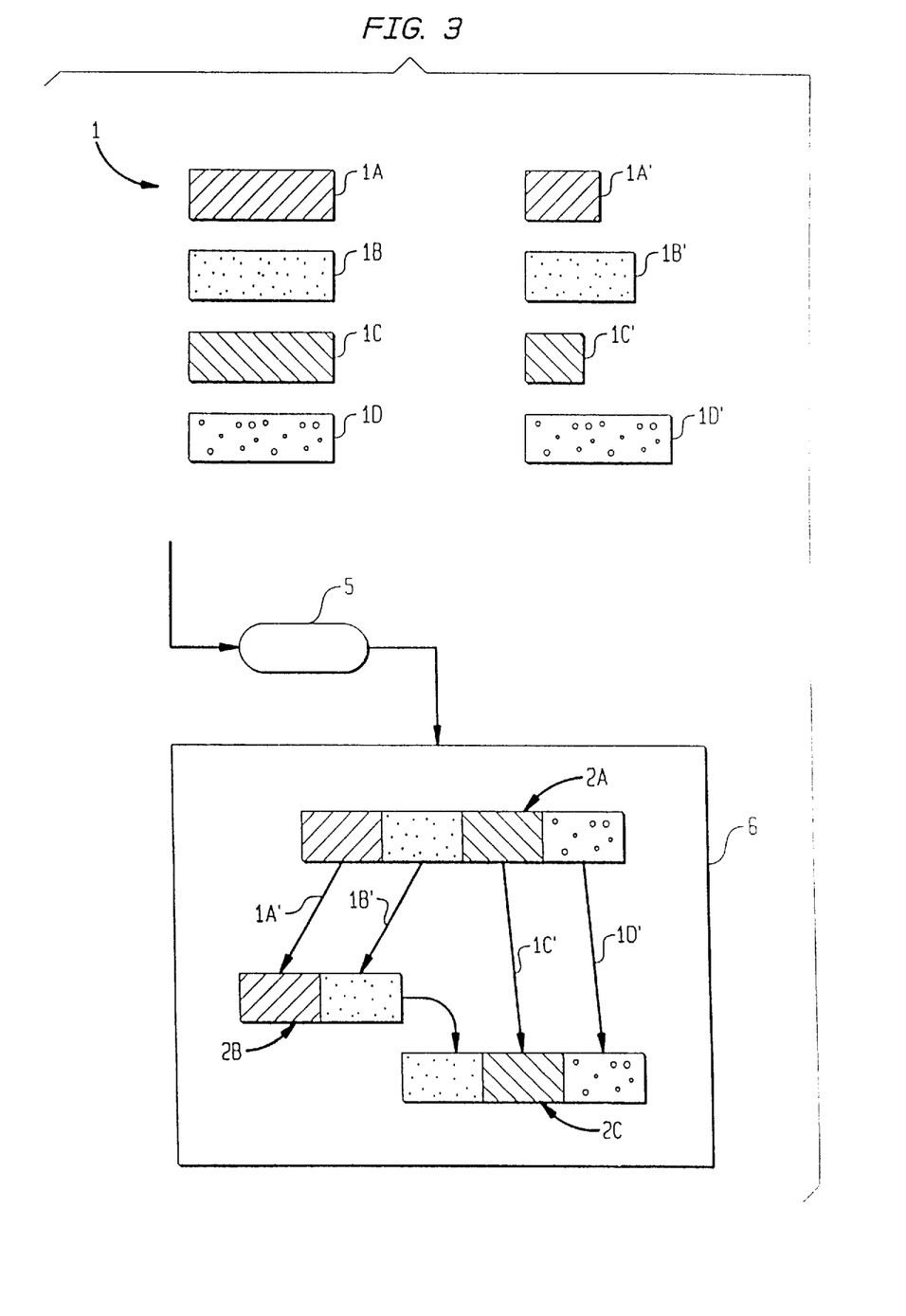
FIG. 3 illustrates the storage format and storage operation for a page within the compression store.

In accordance with the principles of the present invention, compressed data is stored in blocks 2a, 2b, 2c. Compressed lines, 1a', 1b', 1c' 1d' are contained with the blocks, along with pointers which are used to provide access between blocks. The result of compression is illustrated in FIG. 3, where a page 1 of four lines denoted by 1a, 1b, 1c, 1d each of 1 k bytes, is compressed, yielding four lines 1a', 1b', 1c', 1d'.

Associated with the compression store 6 is a list of free or available blocks (free list) 10, each of size 512 bytes. The free list 10 can be stored in the main memory and/or the cache. In the example shown in FIG. 3, three blocks 2a, 2b, 2c are taken from the free list 10, and used to store the compressed page. The blocks are then removed from the free list.

Block 2a is of anchor block format. Within this anchor block 2a, a space of 128 bytes is allocated to each of the compressed lines. This space of 128 bytes is used for pointers to blocks which contain a continuation of the line, and to some fixed number of the leading bytes in the compressed version of the line. As better illustrated in FIG. 5, each anchor block includes a number of entries 52–58. Each entry contains the beginning of each line (in compressed form) and a pointer to the continuation of that line in a continuation block (e.g. 2b). Spaces associated respectively with compressed lines 1a', 1b', 1c', 1d' start at locations 0, 128, 256, and 384 within the anchor block.

Figure 5:
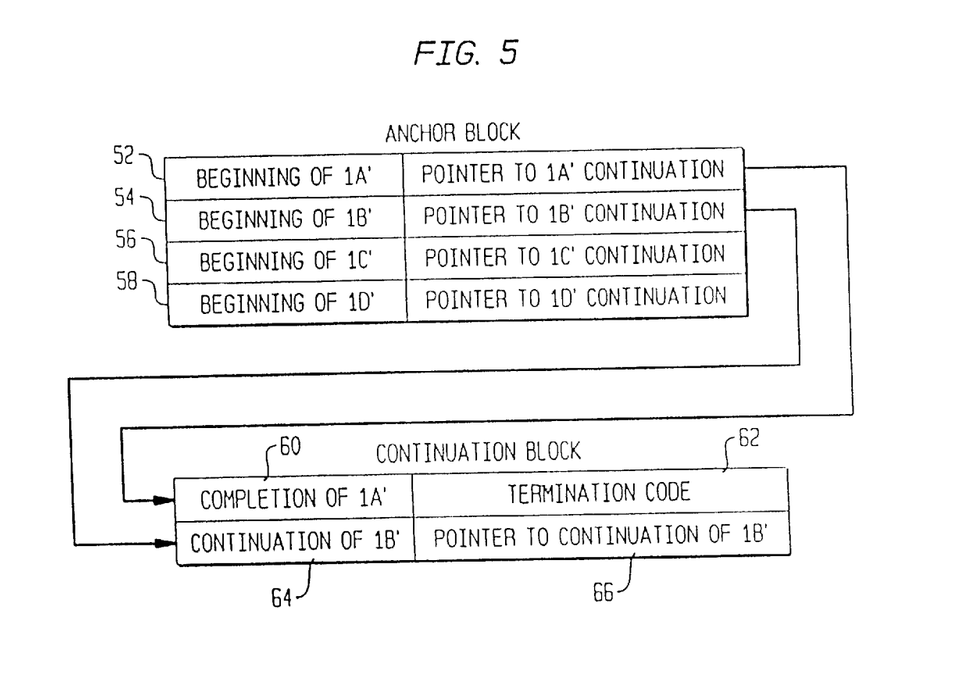

Each continuation block includes either the completion of a compressed line 60 along with a termination code 62 (indicating that no further blocks need be fetched for this line) or the continuation of the line 64 along with a pointer 66 to the further continuation of the line.

Figure 4:
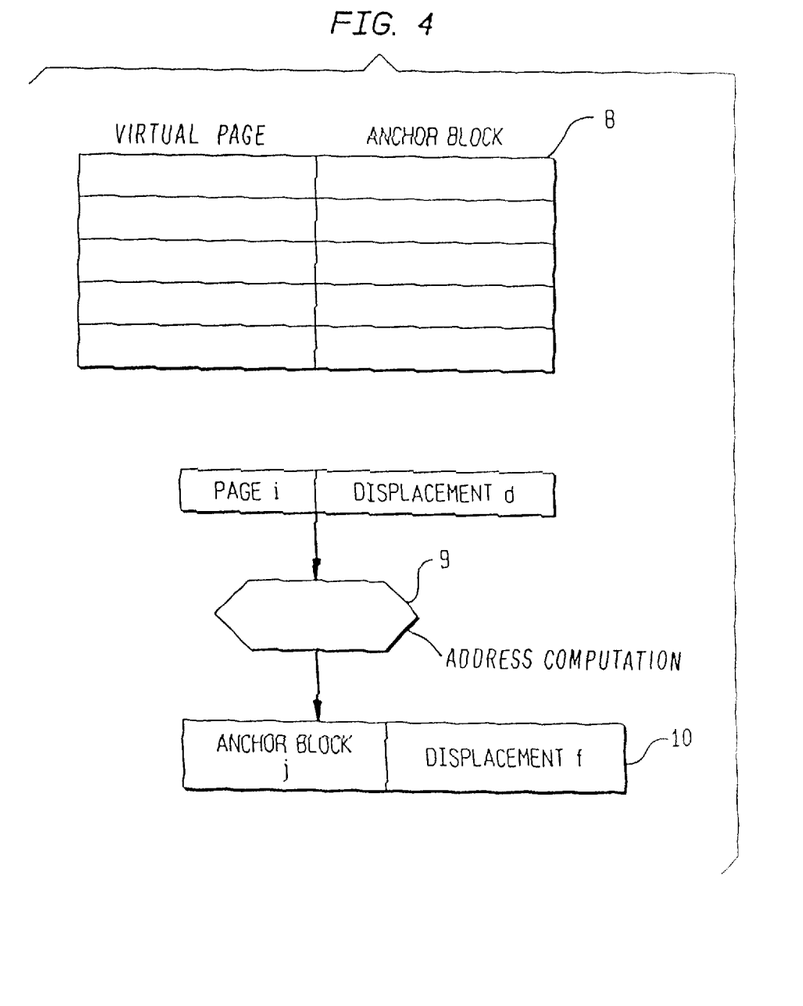
FIG. 4 shows data structures and address computation means for fetching a line from the compression store; and, FIG. 5 is a more detailed diagram of an anchor block and continuation block according to an embodiment of the present invention.

FIG. 4 illustrates data structures used in the retrieval of a line from the compression store 6. A page table 8 (portions of which are stored in the TLB 20 as needed) includes, for each virtual page currently in the compression store 6, the location of the anchor block for this page. A cache miss results in the request for the missing cache line, generally specified by a virtual page number and a displacement d within the virtual page. The virtual page number is used to obtain the address of the anchor block via the page table 8, and the displacement within this page is then processed via address computation logic 9 with the CPU's read controls 12 to obtain a displacement within the anchor block which corresponds to the beginning location associated with the line containing the desired address.

Given the displacement f within the computed address 10, the compressor/decompressor 5 fetches and begins the decompression of the desired line. Decompression may be overlapped with fetching the remainder of the line, stored in other blocks. As shown in FIG. 2, the beginning of a line read from the anchor block 2a can be decompressed and placed in the cache 14 while the remainder of the line is being read from the compression store 6 and decompressed.

Page-outs to I/O devices 7 may be handled similarly, except that all lines within the affected page would be decompressed and transferred.

Another operation of interest is the handling of cast-outs from the cache 14. If the cast out line, say 1a, has been changed, this is compressed by 5 to form a new compressed version of 1a'. In the present implementation, the other lines in this page, 1b', 1c', 1d' are fetched to a buffer in the compressor/decompressor 5. The entire page is now stored via the part (after compression) of the operation, described above, associated with the input of a page from an I/O device 7.

Figure 6:
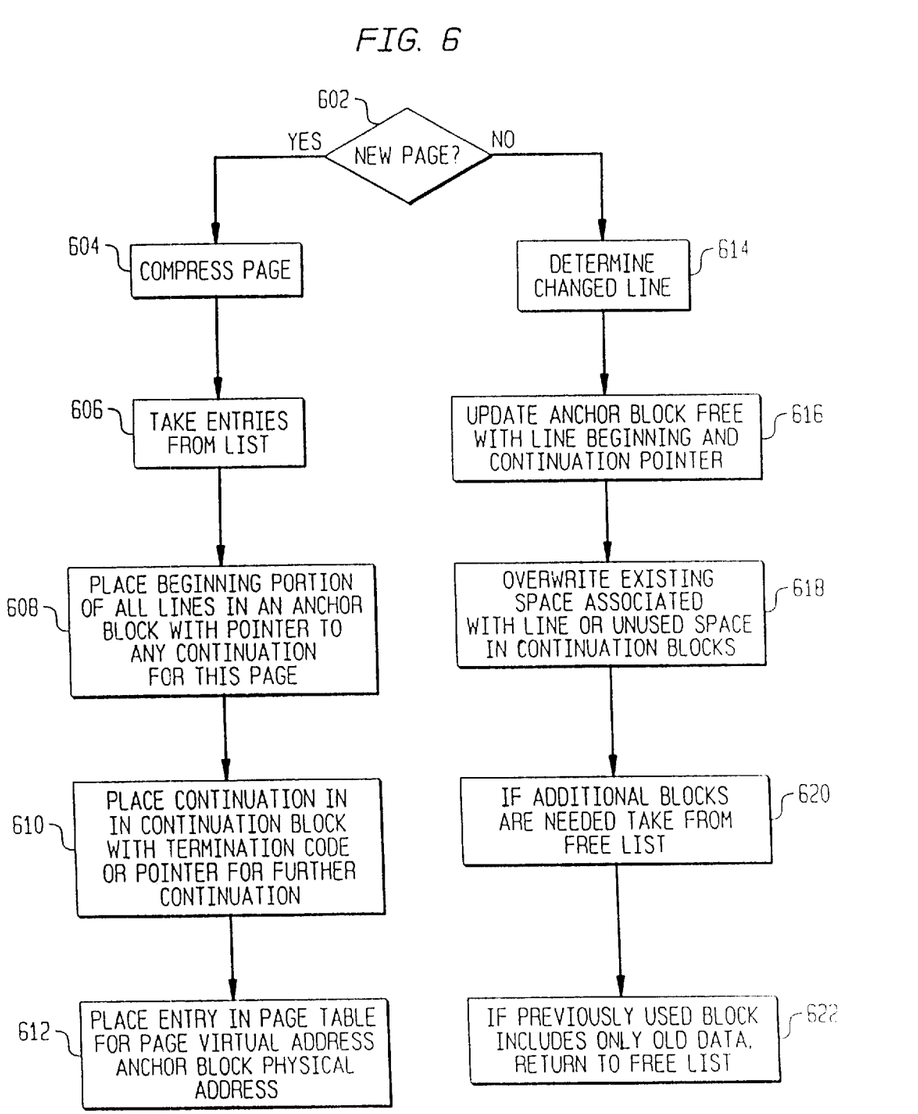
FIG. 6 is an flow chart of writing to compression store in the system of FIG. 2; and, FIG. 7 is a flow chart of reading from the compression store in the system of FIG. 2.

FIG. 6 is a flow chart overview of the storage of compressed data in the system of FIG. 2. In step 602 the system determines the page to be stored is new. If so, the page is compressed in step 604. In step 606 the write controls select and remove the required number of blocks from the free list. The information taken from the free list is used to identify the locations in the compression store where the blocks will be stored in subsequent steps. In step 608, the write controls place the beginning portion of all lines of the page in an anchor block along with pointers to any continuation blocks. In step 610 any continuing portions of lines are placed in continuation blocks with the appropriate continuation pointers or termination pointers as previously described. In step 612 an entry is placed in the page table for the page virtual address and anchor block physical address in the compression store.

If the page is not new, in step 614 the identity of the changed (or new) line is determined. In step 616 the anchor block is updated to reflect the new or changed beginning portion along with the continuation pointer. In step 618, existing space in the continuation blocks is overwritten with new data as needed. In step 620, any additional blocks needed are taken from the free list and, in step 622 any existing blocks which are no longer needed are returned to the free list.

Figure 7:
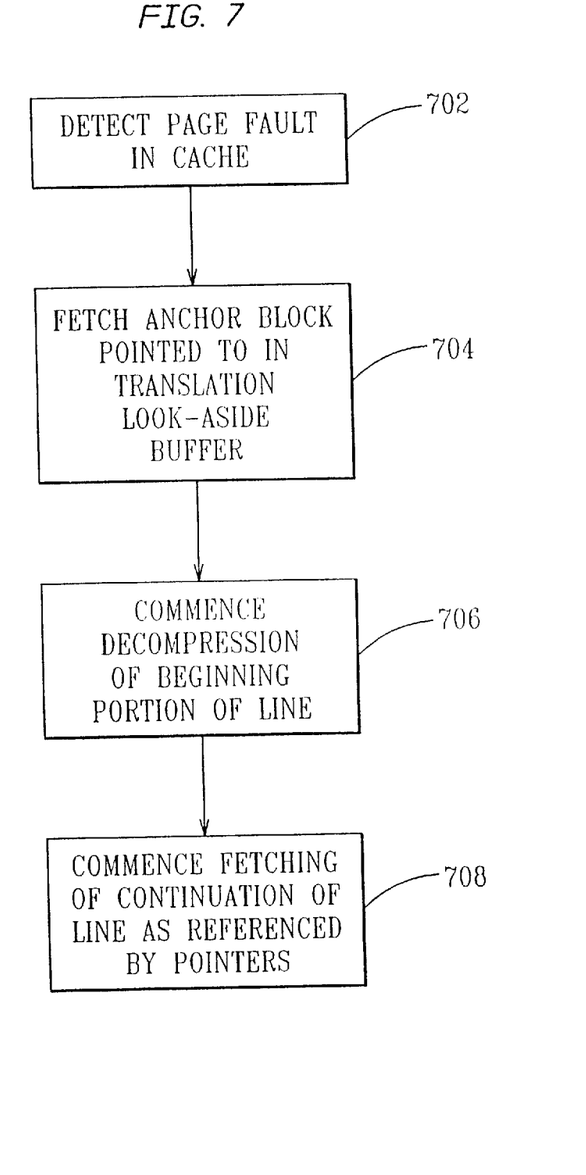

FIG. 7 is a flow chart of reading from the compression store in the system of FIG. 2. In step 702 a cache fault is detected by the cache controls. Then, in step 704, the required portion of the anchor block for a line to be decompressed (pointed to by in the TLB) is fetched. In step 706 decompression of the beginning portion of the line contained in the anchor block is commenced. In parallel with step 706, in step 708 the fetching of any continuation portions is commenced.

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

I claim:

1. A method for storing and accessing data in a main memory of a computer system comprising the steps of:
   a. dividing each page into a plurality of lines, and compressing the lines to form compressed pages comprised of the lines which are placed in random-access storage;
   b. providing a directory to the compressed pages, wherein a location for a directory entry for each page is in a translation table between page virtual addresses and directory entries, and the beginning of descriptors of where the nth line within each page is stored is located at a fixed offset from the location of the directory entry;
   c. providing a set of descriptors for each line which indicates the storage locations for the compressed line;
   d. storing in a set of fixed-size blocks the compressed portions of each line which are not placed in the directory descriptor space.

2. A method as in claim 1, wherein each directory entry points to the first block in a chain of blocks holding the compressed line, and each succeeding block has a pointer to the next succeeding block.

3. A method as in claim 1, wherein the directory entry for each page is contained in an anchor block.

4. The method as in claim 1, comprising the further steps of pipelining the decompression of the beginning portion of a line with fetching continuing portions of the same line.

5. The method as in claim 1, wherein each compressed line is stored in a set of fixed size blocks of storage.

6. The method as in claim 1, further including inserting into the directory descriptor space for a compressed line, the beginning of the compressed line.

7. A method for accessing data in a system wherein compressed pages of data are stored in random access memory comprising the steps of:
   a. dividing each page of data into a plurality of lines of data;
   b. compressing each line of data individually;
   c. storing the beginning of each line of data in a page at a fixed storage position within an anchor block of memory which includes a beginning portion of each of the lines of data and a pointer to any continuing portion of a line of a data, wherein a single address and an offset suffices to access the beginning of any line;

d. storing continuing portions of the lines of data in at least one additional continuation block of memory.

8. A method as claimed in claim 7, wherein the anchor block of memory is divided into an equal number of lines of data, and the fixed storage positions of the beginning of lines of data are equally spaced in the anchor block of memory.

9. A method as claimed in claim 7, wherein the memory size of the anchor block of memory is smaller than the number of bytes in each page.

10. A method as claimed in claim 7, wherein the at least one additional continuation block of memory includes a continuing portion of at least one of the lines of data and a termination code indicating the termination of the at least one of the lines of data.

11. A method as claimed in claim 7, further comprising pipelining the decompression and placement of the beginning portions of lines of data with fetching the continuing portions of lines of data.

12. A method as claimed in claim 7, wherein access to any line in a stored page of data is accessed by providing a single physical address for that page to a translation look-aside buffer.

13. A method as claimed in claim 7, wherein each continuation block of memory includes either the completion of a compressed line of data along with a termination code indicating that no further continuation blocks need to be retrieved for the line, or a continuation portion of the line along with a pointer to a further continuation portion of the line.

* * * * *